United States Patent [19]
Nakamura

[11] 3,945,649
[45] Mar. 23, 1976

[54] COMPLETELY FLUIDTIGHT AND FRICTIONLESS SHAFT SEAL PACKING
[76] Inventor: Giichi Nakamura, 2,4-chome, Gamocho, Joto, Osaka, Japan
[22] Filed: Mar. 18, 1974
[21] Appl. No.: 451,969

[52] U.S. Cl. .............................................. 277/123
[51] Int. Cl.² ......................................... F16J 15/18
[58] Field of Search .......... 277/102, 114, 123, 124, 277/125

[56] References Cited
UNITED STATES PATENTS
| 859,329 | 7/1907 | McMullen | 277/103 |
| 3,419,280 | 12/1968 | Wheeler | 277/124 |

Primary Examiner—Robert I. Smith
Attorney, Agent, or Firm—George B. Oujevolk

[57] ABSTRACT

Shaft seal packing which has a large number of thin annular packing members uprightly set onto, and closely fitted to, a shaft in axial layers by compressing them only axially with respect to each other in a stuffing box, the inner diameter of the annular packing members being almost the same as the diameter of shaft, so as to greatly increase the hydrodynamic resistance between shaft and packing member, and decrease the compression of packing members to shaft, at the same time.

3 Claims, 14 Drawing Figures

FIG. 7
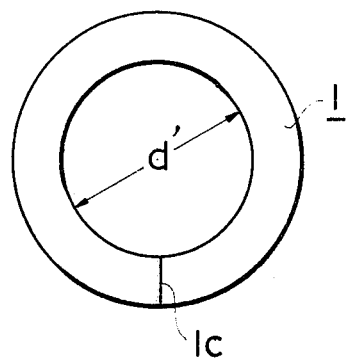
FIG. 8
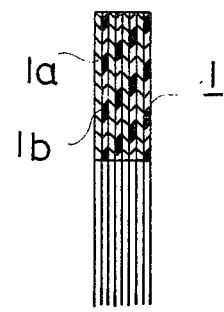
FIG. 9   FIG. 10   FIG. 11
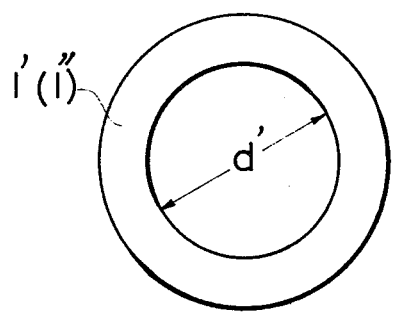
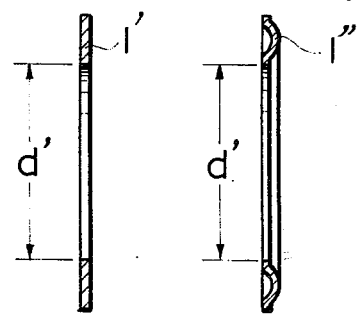
FIG. 12   FIG. 13   FIG. 14
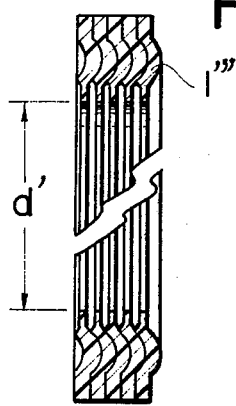
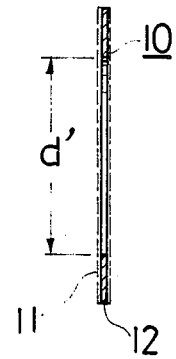
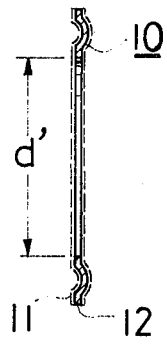

COMPLETELY FLUIDTIGHT AND FRICTIONLESS SHAFT SEAL PACKING

The present invention relates to an apparatus for industrial shaft seal packing, and in its more particular aspects it has to do with the application of this method to sealing a rotating or reciprocating shaft in a fluid tight manner by means of packing in a stuffing box through which the shaft enters a vessel containing a fluid of high pressure and/or temperature.

Such a fluid may tend to leak along the shaft out of the vessel. Conventionally spiral packing or labyrinth packing is usually employed to seal the shaft in a fluid tight manner to prevent the leakage. The former is to seal the shaft by winding a spiral packing member or members around the shaft in a stuffing box, and is often employed in case the vessel contains a fluid of high pressure, for instance, a centrifugal pump and a plunger pump. The latter is to seal the shaft by providing a labyrinth of an annular packing member or members around the shaft in a stuffing box, and is often employed in case the vessel contains a fluid of high pressure and temperature, for instance, steam turbine.

In these kinds of shaft seal packing it is required that the packing member is compressed or brought near to the shaft to provide more or less a fluid tight coupling between the shaft and the packing member. If the packing member is more compressed or brought nearer to the shaft to increase the fluid tight coupling, friction will be increased between the shaft and the packing member that much. The increased friction will cause not only a considerable abrasion of the shaft and packing member but also a considerable loss of the drive required for rotating or reciprocating the shaft. If, however, the packing member are less compressed or brought less near to the shaft to decrease the friction, the fluid tight coupling with be decreased between the shaft and the packing member that much. Also, the decreased fluid tight coupling will cause a considerable leakage of fluid along the shaft out of the vessel. Practically, therefore, no conventional shaft seal packing can be completely fluidtight and frictionless at the same time.

A primary object of the invention is to provide shaft seal packing which is completely fluidtight and frictionless at the same time over a long period of service practically.

Another object of the invention is to make it easy to manufacture a shaft seal packing members designated for the above object.

A further object of the invention is to reduce the length of a stuffing box required for a fluid tight shaft sealing.

Other objects and advantages of the invention will be readily appreciated as the same becomes understood hereinafter when considered in connection with the accompanying drawings in which.

Figure 3:
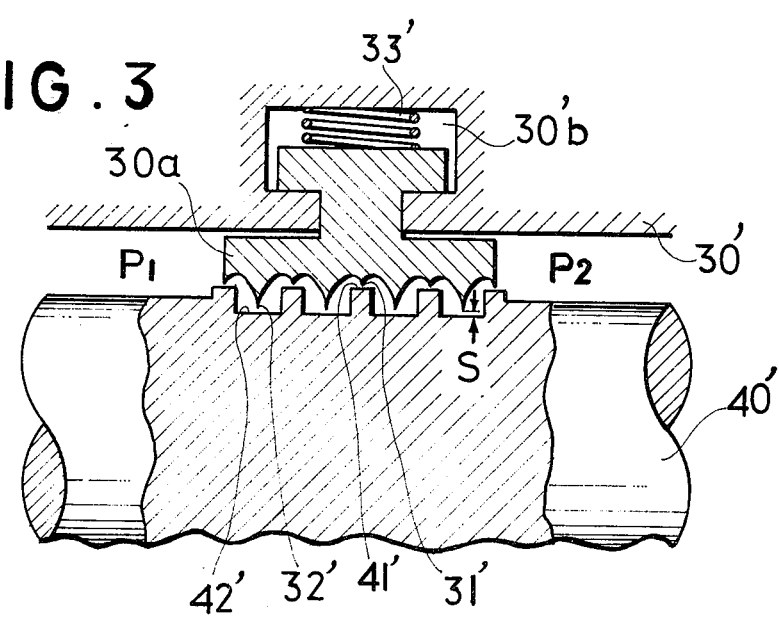
Figure 4:
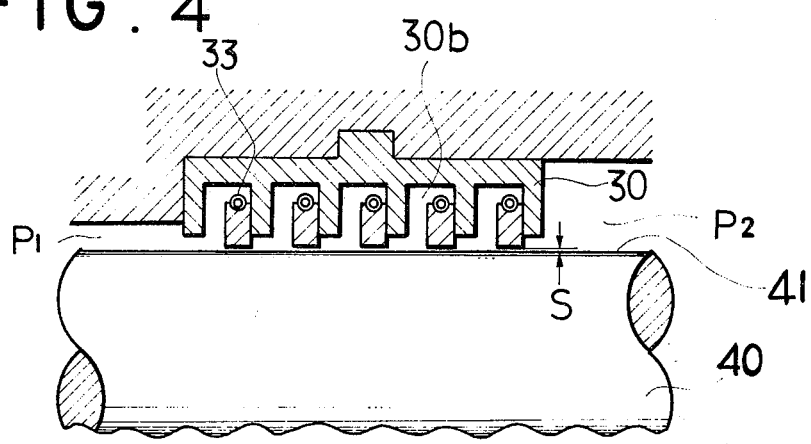
Figure 5:
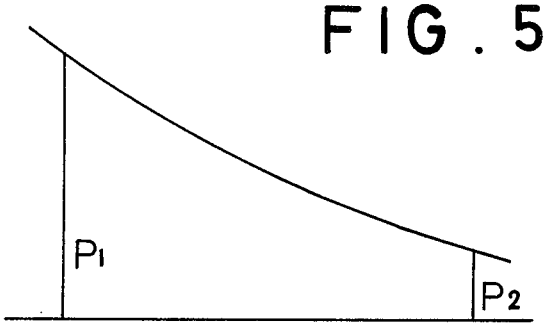
Figure 6:
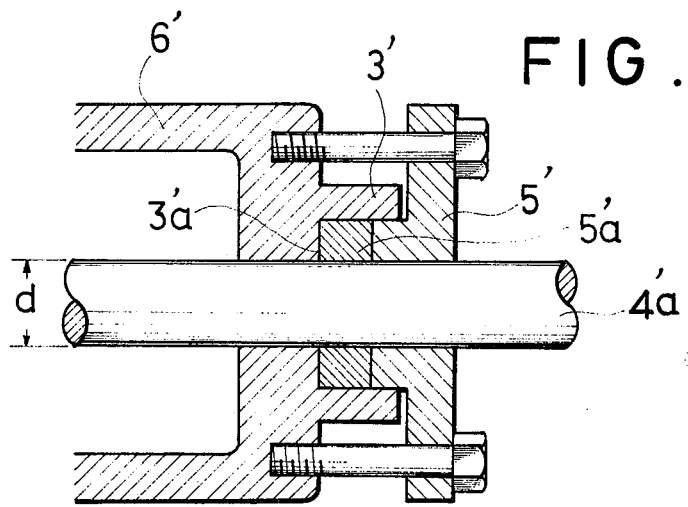

FIG. 3 is a vertical section of a conventional labyrinth packing apparatus in part, FIG. 4 is a vertical section of another conventional labyrinth packing apparatus in part, FIG. 5 diagramatically shows how the pressure of fluid is decreased as it passes through the conventional labyrinth packing apparatus, FIG. 6 is a vertical elevation of a shaft seal packing apparatus embodying the invention, FIG. 7 is a front view of a packing member embodying the invention, FIG. 8 is an enlarged fragmentary vertical section of other packing members embodying the invention, FIG. 9 is a front view of another packing member embodying the invention, FIG. 10 is a vertical section of the packing member in FIG. 9, FIG. 11 is a vertical section of a modification of the packing member in FIG. 10, FIG. 12 is an enlarged vertical section of still other packing members, in part, embodying the invention, FIG. 13 is a vertical section of still another packing member embodying the invention, and FIG. 14 is a vertical section of a modification of the packing member in FIG. 13.

Figure 2:
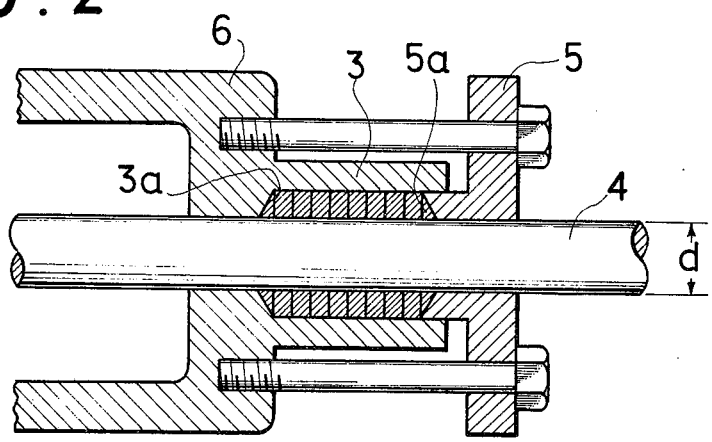
FIG. 2 is a vertical elevation of a conventional spiral packing apparatus.

The conventional spiral packing apparatus shown in FIG. 2 primarily comprises a cylindrical stuffing box 3 through which a rotating or reciprocating shaft 4 passes, a spiral packing member wound around the shaft 4, and a gland 5 at one end of the stuffing box 3 to tighten the packing member.

Figure 1:
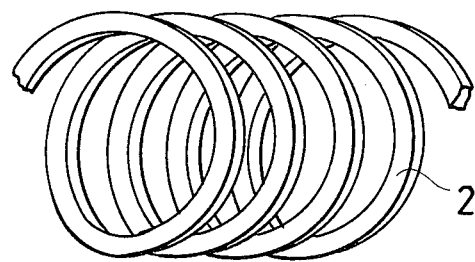
FIG. 1 is a perspective view of a conventional spiral packing member.

The packing member consists of a substantially thick spiral matter as shown in FIG. 1 where it is designated as 2. The stuffing box 3 is mounted on a side wall 6 of a vessel which contains a fluid of high pressure. The stuffing box 3 is provided with a fully open top end and a conical bottom end 3a. The gland 5 is provided with a conical end 5a to be plugged axially into the top end region of stuffing box 3 to tighten the packing member 2. The shaft 4 enters the vessel through the gland 5, stuffing box 3 and vessel side wall 6. Some lubricant may be applied between the shaft 4 and the packing member 2.

The conical ends 3a and 5a are tapered in such an opposite relation to each other that they may tend to compress the packing member 2 toward the center point of packing member between them when the packing member 2 is tightened with the gland 5. The fluid may tend to leak along the shaft 4 out of the vessel.

When the packing member 2 is tightened by plugging the conical end 5a of gland 5 axially into the top end region of stuffing box 3, there actually occur both axial and radial components of force by which the winds of packing member 2 are compressed not only axially to each other but also radially to the shaft 4. This restricts the fluid leaking passage and thus causes a hydrodynamic resistance, thereby providing more or less fluidtightness between the shaft 4 and the packing member 2.

When the packing member 2 is more compressed to the shaft 4 to increase the hydrodynamic resistance and thereby increase the fluidtightness, friction is increased between the shaft 4 and the packing member 2 that much. In this case, the friction is moderated to some extent by the existence of lubricant between the shaft 4 and the packing member 2 if applied, but actually this is not enough to avoid a substantial increase of the friction. When the packing member 2 is less compressed to the shaft 4 to decrease the friction, the hydrodynamic resistance is decreased that much and thereby the fluidtightness is decreased correspondingly. It can therefore be said that the conventional spiral packing apparatus shown in FIG. 2 cannot be completely fluidtight and frictionless at the same time.

The conventional labyrinth packing apparatus shown in FIG. 3 primarily comprises a cylindrical stuffing box 30' through which a rotating or reciprocating shaft 40' passes, a composite annular packing member 30a surrounding the shaft 40', and an annular pocket 30'b within the cylindrical wall of stuffing box 30' to hold the packing member 30a.

The packing member 30a is composed with an inner rim, an outer rim and an intermediate web, all of which are of annular configuration. The inner rim is provided with a plurality of short and long edges 31' and 32' arranged alternately at substantial intervals in the axial direction. The edges 31' and 32' are made of BC alloy, Pb.Ni alloy or other similar materials fusible due to the heat to be caused when they happen to be compressed to the shaft 40'. The outer rim is supported by the elasticity of a compression spring 33' within the annular pocket 30'b. The stuffing box 30' is mounted on a side wall of a vessel (not shown) which contains a fluid of high pressure and temperature. The shaft 40' is provided with a plurality of annular channels comprising ribs 41' and grooves 42' arranged alternately at substantial intervals in the axial direction. The shaft 40' enters the vessel through the stuffing box 30' and the vessel side wall.

The short and long edges 31' and 32' are in such opposite relations to the ribs 41' and grooves 42' with a small clearance S of 0.05 to 0.1 mm being left between them respectively that they provide a labyrinth around the shaft 40' in the stuffing box 30'. The fluid may tend to leak along the shaft 40' out of the vessel.

As the fluid flows through the labyrinth along the shaft 40', the pressure of fluid is gradually decreased as diagramatically shown in FIG. 5 where P1 and P2 indicate the outstanding pressures of fluid before and after it passes through the labyrinth respectively. Usually P2 is more or less approximate to atmospheric pressure. It means that the labyrinth restricts the fluid leaking passage and thus causes a hydrodynamic resistance, thereby providing more or less fluid tight coupling between the shaft 40' and the packing member 30a.

When the packing member 30a is brought nearer to the shaft 40' to increase the hydrodynamic resistance and thereby increase the fluid tight coupling, the shaft 40' is increasingly liable to touch the packing member 30a mostly due to the vibrations of shaft 40' to be caused during running, and thus the packing members 30a is increasingly liable to be compressed to the shaft 40'. The increased compression causes a corresponding increase of friction between the shaft 40' and the packing member 30a. In this case, the friction is moderated to some extent as the edges 31' and 32' are fused due to the compression, but actually this is not enough to avoid a substantial increase of the friction. In addition, the edges 31' and 32', once fused, never return to the original condition but result in a permanent enlargement of the labyrinth passage, thus decreasing the hydrodynamic resistance and thereby decreasing the fluid tight coupling between shaft 40' and packing member 30a permanently. When the packing member 30a is brought less near to the shaft 40' to decrease the friction, the hydrodynamic resistance is decreased that much and thereby the fluid tight coupling is decreased correspondingly.

Theoretically it is possible to provide such a large number of the edges 31' and 32' together with the ribs 41' and grooves 42' in opposite relations along the shaft 40' respectively as to increase the hydrodynamic resistance and thereby increase the fluid tight coupling substantially, even when the packing member 30a is not much brought near to the shaft 40'. This however requires to increase the length of stuffing box 30' substantially because the edges 31' and 32' and ribs 41' and grooves 42' are arranged at substantial intervals in the axial direction respectively. It is impractical to increase the length of stuffing box 30' so much.

Therefore it can practically be said from the above that the conventional labyrinth packing apparatus shown in FIG. 3 cannot be completely fluidtight and frictionless at the same time.

The conventional labyrinth packing apparatus shown in FIG. 4 primarily comprises a cylindrical stuffing box 30 through which a rotating or reciprocating shaft 40 passes, a plurality of split annular packing members embracing the shaft 40, and a plurality of annular helical springs 33 around the packing members to tighten them respectively.

The packing member consists of a substantially thick annular matter made of graphite carbon or other similar materials with a relatively small coefficient of friction against the shaft 40 and radially split into three or six. The stuffing box 30 is mounted within a nozzle member provided for this purpose in a side wall of a vessel (not shown) which contains a fluid of high pressure and temperature. The stuffing box 30 is provided with a plurality of annular partitions by which it is divided into a plurality of annular compartments arranged axially at substantial intervals. The shaft 40 enters the vessel through the stuffing box 30.

The annular packing members are housed in the compartments in a supported relation with the partitions, while they are compressed radially to the shaft 40 with the annular helical springs 33, respectively. There is some clearance provided between the compartments and the shaft 40. And there inevitably exists a small visible clearance S between the shaft 40 and the annular packing members which are radially split and spring-held. Thus the annular compartments and packing members with more or less clearances left between the shaft 40 and themselves provide a labyrinth around the shaft 40 in the stuffing box 30. The fluid may tend to leak along the shaft 40 out of the vessel.

As the fluid flows through the labyrinth along the shaft 40, the pressure of fluid is gradually decreased as diagramatically shown in FIG. 5 where P1 and P2 indicate the outstanding pressures of fluid before and after it passes through the labyrinth respectively. Usually P2 is more or less approximate to atmospheric pressure. It means that the labyrinth restricts the fluid leaking passage and thus causes a hydrodynamic resistance, thereby providing more or less fluidtightness between the shaft 40 and the packing members.

When the packing members are more compressed to the shaft 40 to increase the hydrodynamic resistance and thereby increase the fluid tight coupling, friction is increased between the shaft 40 and the packing members that much. In this case, the friction is moderated to some extent because the packing members are made from a material with a relatively small coefficient of friction against the shaft 40, but actually this is not enough to avoid a substantial increase of the friction. When the packing members are less compressed to the shaft 40 to decrease the friction, the hydrodynamic resistance is decreased that much and thereby the fluidtightness is decreased correspondingly.

Moreover, it is impractical to provide such a large number of the compartments and packing members along the shaft 40 as to increase the hydrodynamic resistance and thereby increase the fluidtightness substantially even when the packing members are not much compressed to the shaft 40, because such requires to increase the length of stuffing box 30 substantially. Therefore it can practically be said that the conventional labyrinth packing apparatus shown in FIG. 4 cannot be completely fluidtight and frictionless at the same time.

Generally in such kinds of shaft seal packing as above referred to, the leaking flow of fluid will be the pressure difference between vessel inside and atmosphere divided by the hydrodynamic resistance of fluid leaking passage all through the stuffing box, in another expression:

$$Fw = P/R \quad (1)$$

where;
- $Fw$ = Leaking flow of fluid
- $P$ = Pressure difference between vessel inside and atomosphere
- $R$ = Hydrodynamic resistance of fluid leaking passage all through stuffing box In the relation (1) $Fw$ is in reverse proportion to $R$, given $P$. Thus the more the hydrodynamic resistance of fluid leaking passage all through the stuffing box is, the less the leaking flow of fluid is. If the hydrodynamic resistance $R$ is very large, the leaking flow $Fw$ will be very small and practically negligible according to the relation (1), and thus practically complete fluidtightness will be provided between the shaft and the packing member.

Also generally in such kinds of shaft seal packing as above referred to, the friction between shaft and packing member will be the compression of packing member to shaft times the coefficient of friction between shaft and packing member, in another expression:

$$Fr = C \times f \quad (2)$$

where;
- $Fr$ = Friction between shaft and packing member(s)
- $C$ = Compression of packing member(s) to shaft
- $f$ = Coefficient of friction between shaft and packing member The coefficient of friction is usually given by the materials of shaft and packing member. There are some materials, for instance metallic shaft versus nylon packing member, whose coefficient of friction varies to increase in response to an increase of their mutual compression in a range of relatively large compressing loads as is often the case with industrial shaft seal packing. However, there are no materials whose coefficient of friction varies to decrease in response to an increase of their mutual compression. It will therefore be reasonable to presume that $f$ is given in the relation (2), and then $Fr$ is in proportion to $C$. Thus the less the compression of packing member(s) to shaft is, the less the friction between shaft and packing member(s) is. If the compression $C$ is very small, the friction $Fr$ will be very small and practically negligible according to the relation (2), and thus practically complete frictionlessness will be provided between the shaft and the packing member(s).

In the conventional shaft seal packing apparatus shown in FIGS. 2, 3, and 4 the hydrodynamic resistance $R$ is increased by such a seal as increases the compression $C$ correspondingly, and the compression $C$ is decreased by such a method as decreases the hydrodynamic resistance $R$ correspondingly. Therefore any substantial decrease of the leaking flow $Fw$ results in a substantial increase of the friction $Fr$, and any substantial decrease of the friction $Fr$ results in a substantial increase of the leaking flow $Fw$, given the pressure difference $P$ and the coefficient of friction $f$. Thus complete fluidtightness and complete frictionlessness are not compatible with each other practically in the conventional shaft seal packing apparatus.

It follows that complete fluid tight coupling and complete frictionlessness will be compatible with each other practically if the hydrodynamic resistance $R$ is increased substantially by such a seal as avoids increasing the compression $C$ correspondingly, while the compression $C$ is decreased substantially by such a seal as avoids decreasing the hydrodynamic resistance $R$ correspondingly, given the pressure difference $P$ and the coefficient of friction $f$. And this is the basic idea of the present invention.

The general feature of the invention is such that, in a stuffing box through which a rotating or reciprocating shaft passes into a vessel containing a fluid of high pressure and/or temperature, a plurality of substantially thin annular packing members are put in axial layers on the shaft and then substantially compressed only axially to each other in an uprightly setting and closely fitting relation to the shaft, the inner diameter of annular packing member being substantially the same as the diameter of shaft, thereby on one hand increasing the hydrodynamic resistance between shaft and packing members, and on the other hand decreasing the compression of packing members to shaft, so much substantially as to provide practically complete fluidtightness and frictionlessness between the shaft and the packing members at the same time; given the pressure difference between vessel inside and atmosphere and also the coefficient of friction between shaft and packing member.

Referring to FIG. 6, the shaft seal packing apparatus embodying the invention primarily comprises a cylindrical stuffing box 3' through which a rotating or reciprocating shaft 4'a passes, a plurality of annular packing members put in axial layers on the shaft 4'a, and a gland 5' at one end of the stuffing box 3' to tighten the packing members.

The packing member consists of a substantially thin annular matter with an inner diameter of $d'$ as shown in FIG. 7 where it is designated as 1. Because it is substantially thin, the packing member 1 has a substantially large flexibility, even in case it is made of a metallic material for instance aluminium. Each packing member 1 is provided with a radial slit 1c to facilitate putting radially onto the shaft 4'a. The stuffing box 3' is mounted on a side wall 6' of a vessel which contains a fluid of high pressure and/or temperature. The stuffing box 3' is provided with a fully open top end and a flat bottom end 3'a. The gland 5' is provided with a flat end 5'a to be plugged axially into the top end region of stuffing box 3' to tighten the packing members 1. The shaft 4'a enters the vessel through the gland 5', stuffing box 3' and vessel side wall 6'. The shaft 4'a has a diameter of $d$.

The inner diameter $d'$ of annular packing member 1 is substantially the same as the diameter $d$ of shaft 4'a. A substantially large number of the annular packing members 1 are put in axial layers on the shaft 4'a. The flat ends 3'a and 5'a are in such a rightly opposite relation to each other that they may substantially compress the packing members 1 only axially to each other between them when the packing members 1 are tightened with the gland 5'. The fluid may tend to leak along the shaft 4'a out of the vessel.

When the packing members 1 are tightened by plugging the flat end 5'a of gland 5 axially into the top end region of stuffing box 3', there occurs no radial component of force to compress the packing members 1 radially to the shaft 4'a, but the packing members 1 are compressed only axially to each other. Thus the packing members 1 are uprightly set on the shaft 4'a in axial layers without compressing the shaft 4'a at all.

In the setting condition the annular packing members 1 are closely fitted to the shaft 4'a because the inner diameter $d'$ of packing member 1 is substantially the same as the diameter $d$ of shaft 4'a, and because the packing members 1 have a substantially large flexibility. A substantially large number of the annular packing members 1 closely fitted to the shaft 4'a in axial layers restrict the fluid leaking passage substantially and thus cause a substantial hydrodynamic resistance, thereby providing substantial fluidtightness between the packing members 1 and the shaft 4'a.

Here the fluid leaking passage all through the stuffing box 3' may be regarded to be an aggregation of sectional fluid leaking passages which lie between individual packing members 1 and shaft 4'a respectively. Then the hydrodynamic resistance of fluid leaking passage all through the stuffing box 3' will be the sum of the hydrodynamic resistances of sectional fluid leaking passages between individual packing member 1 and shaft 4'a, in other words, the hydrodynamic resistance of each sectional fluid leaking passage between individual packing member 1 and shaft 4'a times the total number of packing members 1 as expressed in the following relation:

$$R = r \times n \qquad (3)$$

where;
R = Hydrodynamic resistance of fluid leaking passage all through stuffing box
r = Hydrodynamic resistance of each sectional fluid leaking passage between individual packing member and shaft
n = Total number of packing members From the relations (1) and (3):

$$Fw = \frac{P}{r \times n} \qquad (4)$$

Because each packing member 1 is closely fitted to the shaft 4'a, the hydrodynamic resistance of each sectional fluid leaking passage between individual packing member 1 and shaft 4'a is considerably large; thus $r$ is considerably large in the relation (4). As a substantially large number of the packing members 1 are put on the shaft 4'a, $n$ is substantially large in the relation (4). Hence $r \times n$ is very large. Given P, therefore, the leaking flow Fw is very small and practically negligible according to the relation (4). It means that practically complete fluidtightness is provided between the shaft 4'a and the packing members 1.

In setting the packing members 1 on the shaft 4'a the packing members 1 are not compressed radially to the shaft 4'a at all, because the packing members 1 are compressed only axially to each other. In fitting the packing members 1 to the shaft 4'a there may occur a slight radial compression of the packing members 1 to the shaft 4'a, but this is substantially small and practically negligible because the packing members 1 have a substantially large flexibility, and because $d'$ is substantially the same as $d$. Thus the compression C is very small in the relation (2). Given $f$, therefore, the friction Fr is very small and practically negligible according to the relation (2). It means that practically complete frictionlessness is provided between the shaft 4'a and the packing members 1.

The practically complete fluidtightness and the practically complete frictionlessness provided as above are perfectly compatible with each other; since the hydrodynamic resistance R is increased substantially without accompanying any corresponding increase of the compression C, while the compression C is substantially decreased without accompanying any corresponding decrease of the hydrodynamic resistance R, given the pressure difference P and the coefficient of friction f. Therefore it can practically be said that the embodiment shown in FIG. 6 is completely fluidtight and frictionless at the same time.

Moreover, a substantially large number of the annular packing members 1 in axial layers can be housed in a considerably short stuffing box, since the packing members 1 are substantially thin. Therefore the length of stuffing box 3' can be reduced considerably.

The annular packing members 1 may be made of a metallic material for instance aluminium, so long as they are substantially thin and thereby have a substantially large flexibility. Actually in case it is provided with a substantially large number of the packing members 1 consisting of annular aluminium foils respectively, the shaft seal packing apparatus shown in FIG. 6 runs quite lightly with the shaft 4'a being driven by a directly coupled motor and shows no trace of abrasion on the shaft 4'a and packing members 1 in 3 hours' continuous running; no lubricant is applied between the shaft 4'a and the packing members 1.

During the running, however, the packing members 1 are flexed excessively due to the vibrations of shaft 4'a. Once flexed, the packing members 1 of aluminium foils cannot return from the excessively flexed condition to the originally fitted condition by themselves due to lack of elasticity but result in enlarging more or less their inner diameters permanently. Then the packing members 1 are not fitted closely to the shaft 4'a any more, and thus $r$ is not considerably large in the relation (4) any more but considerably small now. Hence $r \times n$ is not very large. Given P, now therefore, the leaking flow Fw is not very small but practically significant according to the relation (4). It means that practically complete fluidtightness is not provided between the shaft 4'a and the packing members 1 any more. Actually the aluminium packing members 1 have some leakage before the 3 hours' continuous running is completed.

The annular packing members 1 may be made up with a plurality of aluminium foils 1a and elastic synthetic resin films 1b arranged alternately in axial layers as shown in FIG. 8. The packing members 1a and 1b consist of annular matters similar to the one shown in FIG. 7 respectively, and are connected with each other by applying adhesive to their outer peripheries to facilitate setting on the shaft 4'a.

The packing members 1a and 1b are also flexed excessively due to the vibrations of shaft 4'a during running. In this case, however, the synthetic resin films 1b follow the vibrations of shaft 4'a continuously and return from the excessively flexed position to the originally fitted condition without delay because of its elesticity. As they return to the original condition, the synthetic resin packing members 1b bring the adjacent aluminium packing member 1a forcedly into their original condition respectively. Thus the inner diameters of packing members 1a and 1b are not enlarged permanently but remain in the originally fitted condition substantially through long running, in other words, they remain in a closely fitting relation to the shaft 4'a through long running.

Actually in case it is provided with the annular packing members 1 of aluminium foils 1a and elastic synthetic resin films 1b, the shaft seal packing apparatus shown in FIG. 6 runs quite satisfactorily with the shaft 4'a being driven by a directly coupled motor while the vessel contains water with a pressure of 60 kg/cm², it shows no trace of either abrasion or leakage at all in 3 hours' continuous running. Therefore it can be said that practically the embodiment shown in FIG. 6 with the packing members 1 as shown in FIG. 8 is completely fluidtight and frictionless at the same time over a long period of service.

The packing member may consist of such an annular matter as shown in FIG. 9 where it is designated at 1' or 1". The packing member 1' or 1" is all the same as the one shown in FIG. 7, except it is not provided with a radial slit. The packing member 1' or 1" may be preferable for putting axially onto the shaft.

The packing member 1' consists of a plain annular matter as shown in FIG. 10, while the packing member 1" consists of a rimmed annular matter as shown in FIG. 11. And both are the same in front view, as shown in FIG. 9.

In manufacturing the packing members 1' it is required that the inner diameter of packing member 1' is substantially the same as the diameter of shaft with practically negligible tolerance in order to have them fitted to the shaft neither deficiently nor excessively but just closely, in another expression:

$$d' = d \pm \alpha \ (\alpha \quad 0) \tag{5}$$

where;
$d$ = Diameter of shaft
$d'$ = Inner diameter of packing member
$\alpha$ = Tolerance If, however, the tolerance $\alpha$ is not substantially about zero in the relation (5), the packing members 1' will be fitted to the shaft either deficiently or excessively. The deficient fitting decreases $r$ and thereby increases Fw in the relation (4), while the excessive fitting increases C and thereby increases Fr in the relation (2); in other words, either fluid tight coupling is decreased or friction is increased more or less between the shaft and the packing members 1'. Usually, however, it is not easy to make the tolerance $\alpha$ substantially approximate to nought and thus practically negligible.

In manufacturing the packing members 1" it is sufficient that the inner diameter of packing member 1" is substantially the same as the diameter of shaft with some positive tolerance which is practically neither very large nor very small, in order to have them fitted to the shaft neither deficiently nor excessively but just closely, in another expression:

$$d' = d + \alpha \tag{6}$$

where;
$d$ = Diameter of shaft
$d'$ = Inner diameter of packing member
$\alpha$ = Tolerance As the packing members 1" manufactured with some positive tolerance $\alpha$ are compressed axially to each other in an uprightly setting relation to the shaft, the packing members 1" expand themselves radially due to the existence of rims and thus substantially make themselves fitted just closely to the shaft. In means that the tolerance $\alpha$ is substantially approximate to nought in the state that the packing members 1" are uprightly set on the shaft in axial layers.

It is usually much easier in manufacturing to take the relation (6) and allow some positive tolerance than take the relation (5) and allow practically negligible tolerance. Therefore the packing members 1" are usually much easier to manufacture than the packing members 1'.

The annular packing members of elastic synthetic resin films may be put in axial layers without intermediary of packing members made from other materials, for instance, such aluminium foils as shown in FIG. 8. The synthetic resin may be either thermoplastic or thermosetting.

In case the annular packing members 1" shown in FIG. 11 are made of thermoplastic resin, they tend to stick to each other when they are compressed axially to each other in an uprightly setting relation to the shaft. The sticked packing members 1" may not be regarded to a plurality of substantially thin independent matters any more but one thick block matter substantially, and thus have not a substantially large flexibility any more. Due to lack of flexibility the sticked packing members 1" are not fitted closely to the shaft but compressed considerably to the shaft as they are radially expanded on the occasion of setting due to the existence of rims. This increases C and thereby increases Fr in the relation (2). In other words, friction is increased considerably between the shaft and the packing members 1". Actually the shaft does not run satisfactorily when it is provided with the packing members 1" of thermoplastic resin films each of which is as thin as 1 mm.

The annular packing members designated as 1''' in FIG. 12 are made of thermoplastic resin and have the same front view as the one shown in FIG. 9. The inner periphery of annular packing member 1''' is made substantially thinner than the outer periphery. The packing members 1''' are connected with each other by applying adhesive to their outer peripheries to facilitate setting on the shaft.

When the packing members 1''' are compressed axially to each other in an uprightly setting relation to the shaft, there is a substantial clearance left between the inner peripheries of each two adjacent packing members 1''' because they are substantially thinner than the outer periperies, and thus the inner peripheries of packing members 1''' do not stick to each other into a block matter but still remain to be a plurality of substantially thin independent matters having a substantially large flexibility. Therefore the packing members 1''' are not compressed considerably to the shaft but fitted closely to the shaft. In other words, friction is not increased considerably between the shaft and the packing members 1′′′.

Actually the shaft runs quite satisfactorily when it is provided with the packing members 1′′′ of thermoplastic synthetic resin films each of which is 0.3 mm thick in the inner periphery and 1 mm thick in the outer periphery.

In case the annular packing members 1′′ shown in FIG. 11 are made of thermosetting resin, they do not tend to stick to each other when they are compressed axially to each other in an uprightly setting relation to the shaft. However, it requires a number of molds at a time to manufacture the annular packing members 1′′ of thermosetting resin in quantity on an industrial scale.

Whether thermoplastic or thermosetting, it is not easy to manufacture the annular packing members wholly of synthetic resin to the desired outline and dimensions in a substantial approximation because their thermal expansion is substantially large.

The annular packing member may be made of a woven or non-woven fabric matter filled with elastic synthetic resin. This one is usually much easier to manufacture than those which are wholly made of synthetic resin, because the fabric matter provides the desired outline and dimensions of packing member in a substantial approximation, and because such matter restricts the thermal expansion of synthetic resin substantially.

The annular packing member designated as 10 in FIG. 13 comprises an elastic center 12 and a flexible solid jacket 11 laid over the center 12. The center 12 may be made of a fabric matter filled or not filled with synthetic resin. The jacket 11 may be made of a metallic sheet or sheets. The packing member 10 is also much easier to manufacture than those which are wholly made of synthetic resin, because the solid jacket 11 determines the desired outline and dimensions of packing member 10 definitely without being influenced by thermal expansion. In addition, the packing members 10 do not stick to each other at all because of the solid metallic jackets 11 when compressed axially to each other in an uprightly setting relation to the shaft.

The annular packing member shown in FIG. 14 is the same as the one shown in FIG. 13, except it is provided with a rim in the outer periphery.

The packing members may be made of various other materials, depending on the operating conditions, fluid properties and other influential factors.

It will be understood that further modifications may be made in the constructions of the above shown embodiments, and that the invention is in no way limited to the above embodiments.

What I claim:

1. A seal packing arrangement for a cylindrical shaft comprising a cylindrical stuffing box through which a rotating or reciprocating shaft enters a vessel containing a fluid of high pressure and/or temperature, a multiplicity of substantially thin flexible annular disc-like synthetic resin elastic matter packing members put in upright axial layers around said shaft, in a close, compressed fitting relationship, one upon the other, said disclike packing members having a defined periphery around said members with inner and outer parts, the inner periphery part of said annular packing members being substantially thinner than the outer periphery part thereof; and a gland at one end of said stuffing box to tighten said annular packing members, said stuffing box being provided with an open top end and a flat bottom end, said gland being provided with a flat end to be plugged axially into the top end region of said stuffing box to tighten said annular packing members, the inner diameter of said annular packing member being substantially the same as the diameter of said shaft, said flat end of stuffing box and said flat end of the gland being in such a juxtaposed opposite relation to each other so that said flat ends may compress said packing members substantially only axially upon each other when said packing members are tightened with said gland, whereby said annular packing members may be in an uprightly setting and closely fitting relation to said shaft while they are substantially compressed only axially to each other, thereby on one hand increasing the hydrodynamic resistance between said shaft and said packing members, and on the other hand decreasing the compression of said packing members to said shaft, so as to provide practically a complete fluid tight and frictionless coupling between said shaft and said packing members at the same time, notwithstanding the pressure difference between the inside of said vessel and atmosphere and also the coefficient of friction between said shaft and said packing members.

2. A shaft seal packing arrangement in accordance with claim 1, wherein said annular packing member has a defined outer periphery and is provided with a rim in the said periphery thereof, the inner diameter of said annular packing member being substantially the same as the diameter of said shaft with a positive tolerance, so that said annular packing members may expand themselves radially to be fitted closely to said shaft when they are substantially compressed axially upon each other in an uprightly setting relation to said shaft.

3. A shaft seal packing apparatus in accordance with claim 8, wherein the thickness of said inner periphery of said annular packing member is less than 1 mm and the thickness of said outer periphery thereof is not less than 1 mm.

* * * * *